(12) United States Patent  
Ginder et al.

(10) Patent No.: US 6,290,043 B1  
(45) Date of Patent: Sep. 18, 2001

(54) SOFT START COMPRESSOR CLUTCH

(75) Inventors: John M. Ginder, Plymouth; Larry D. Elie, Ypsilanti; Shane A. Harte, Farmington Hills; Vipen Khetarpal, Novi; Alex David Cohen, Oak Park, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/474,623

(22) Filed: Dec. 29, 1999

(51) Int. Cl.$^7$ ..................................................... F16D 35/00
(52) U.S. Cl. .......................... 192/21.5; 192/52.4; 417/319
(58) Field of Search .................................. 192/21.5, 52.4; 417/319; 418/69

(56) References Cited

U.S. PATENT DOCUMENTS

| | | | |
|---|---|---|---|
| 4,849,120 | * 7/1989 | Price et al. ........................ | 192/21.5 X |
| 4,898,266 | * 2/1990 | Garrett et al. ........................ | 192/21.5 |
| 4,967,887 | * 11/1990 | Annacchino et al. ............... | 192/21.5 |
| 5,469,947 | * 11/1995 | Anzai et al. ........................ | 192/21.5 |
| 5,816,372 | 10/1998 | Carlson et al. . | |
| 5,985,168 | 11/1999 | Phule . | |

* cited by examiner

Primary Examiner—Richard M. Lorence
(74) Attorney, Agent, or Firm—Larry I. Shelton

(57) ABSTRACT

An electromagnetic clutch (10) for an air conditioning compressor includes a generally cylindrical pulley (11) rotatably mounted on a compressor housing (16) and having an annular friction surface (21b), a driven member (12) mounted on a compressor shaft (13) and having an annular friction surface (21a) positioned radially adjacent the first friction surface to form an annular space (21c) therebetween. A quantity of flowable magnetic material (27) is provided in the annular space (21c) and a magnetic coil (34) is fixed on the housing adjacent thereto. A control (40,46,46') connected to the magnetic coil (34) supplies electrical power from a power supply (47) to energize the magnetic coil and create magnetic flux in the annular space (21c) polarizing the magnetic material and frictionally coupling the first and second friction surfaces (21a,21b) to cause the pulley (11) to rotate the driven member (12). The control (40,46,46') can pulse width modulate or ramp the supplied power for "soft" starting and/or stopping of the compressor.

20 Claims, 3 Drawing Sheets

SOFT START COMPRESSOR CLUTCH

BACKGROUND OF THE INVENTION

1. Technical Field

This invention relates to the field of clutches for a compressor in an air conditioning system. More particularly, the invention pertains to such a clutch having soft start characteristics.

2. Description of the Prior Art

A compressor for an air conditioning system of an automobile typically includes a clutch to enable disengagement of the compressor during periods in which no air conditioning is desired. During demand situations, the clutch is engaged so that the compressor compresses the refrigerant in a known manner. Prior art clutches typically are of an electromagnetic friction clutch construction. A compressor typically is driven by a V-groove pulley assembly supported by a bearing pressed onto the body of the compressor. The pulley is driven by the automotive accessory drive belt.

Prior art clutches typically include an armature affixed to the splined shaft of the compressor via a bolt. A stationary wire coil assembly is press-fit to the compressor housing. The armature is normally separated by a small air gap from the pulley face by a spring mechanism, so that the clutch is normally disengaged. Automotive voltage is applied to the coil to engage the clutch, normally having a nominal value of 14.4 volts. Upon application of this voltage, the current in the coil increases from zero on a time scale related to the inductive time constant of the clutch, typically 150 milliseconds. The current induces magnetic flux to flow in the pulley, across the air gap, and into the armature. When the magnetic flux density reaches a critical level, the attractive force between the armature and the pulley becomes large enough to overcome the spring force holding the armature away from the pulley. The armature is then rapidly drawn into contact with the pulley, suddenly initiating torque transfer to the compressor and causing the compressor shaft to begin to rotate. When the shaft speed matches the pulley speed, the torque then reaches a steady-state level that is a function of pulley speed, cooling demand, and other vehicle operational characteristics.

When such a prior art clutch is engaged, undesirable effects can occur, including stumble, surge, and noise. Stumble is a longitudinal vehicle vibration induced by the sudden change in engine torque demand which occurs upon compressor engagement. Surge is a lurch that occurs when the clutch is disengaged. Noise is generated as the armature of the electromagnetic friction clutch is rapidly driven into contact with the clutch pulley during engagement. These effects of rapid compressor engagement are objectionable to the vehicle occupants and may contribute to premature failure of compressor components. Previous efforts to overcome these concerns include using passive mechanical means, such as mating slots or other structures provided in the pulley and armature, which are said to reduce the rate of increase of magnetic force. An example of this is illustrated in U.S. Pat. No. 4,749,073 to Olden.

Another attempt to reduce these concerns includes the insertion of an elastomeric coupling between the armature and compressor shaft to damp transients encountered during engagement and operation, as shown in U.S. Pat. No. 5,219,273 to Chang. Other attempts to reduce these concerns include electronic controls of the clutch current in an attempt to produce soft-start coupling, as described in U.S. Pat. No. 4,509,091 to Booth and U.S. Pat. No. 4,567,975 to Roll. These patents disclose a method of generating a time-varying clutch current. These methods draw the armature initially to the pulley, but allow the pulley to slip. The clutch current is increased smoothly to gradually increase the level of torque transfer and decrease the slip until a state of complete engagement is reached. These methods permit slip, which causes the electromagnetic friction clutch surfaces to become burnished over time, reducing the ability of the clutch to transfer torque.

It would therefore be desirable to provide a clutch which softens the engagement of an air conditioning compressor, but which does not cause excessive wear of the clutch friction surfaces.

SUMMARY OF THE INVENTION

Accordingly, an object of the present invention is to provide, in an air conditioning compressor a clutch having a soft start which does not experience excessive wear.

An advantage of the use of a clutch according to the present invention is that the air conditioning system will have less objectionable noise and vibration. A second advantage is that, by reducing the objectionable characteristics of such a system, one may cycle the clutch more frequently and thereby maximize fuel efficiency and optimally control the temperature of the passenger compartment.

Further advantages include having the ability to operate the compressor at high speeds. With conventional clutches, operation at high engine RPMs causes undesirable noise. With a clutch according to the present invention, the clutch may be slipped, permitting lower RPM operation for a given input speed.

The present invention concerns an electromagnetic clutch for an air conditioning compressor housed in a compressor housing having a drive shaft extending from the housing and being rotatable about an axis of rotation. The clutch includes a generally cylindrical driving member having an axis of rotation and a peripheral annular first frictional surface, an annular driven member extending about the driving member and having an axis of rotation coaxial with the driving member axis of rotation, the driven member having an annular second frictional surface positioned radially adjacent the first frictional surface to form an annular space therebetween, a quantity of flowable magnetic material provided in the annular space, a magnetic coil positioned adjacent the annular space and control means connected to the magnetic coil for supplying electrical power from a power supply to energize the magnetic coil. When the driven member is attached to the compressor shaft, the driving member is rotatably mounted on the compressor housing and the magnetic coil is fixed to the compressor housing, the driving member can be rotated without rotating the driven member. When the control means applies electrical power to the magnetic coil, magnetic flux is created in the annular space polarizing the magnetic material and frictionally coupling the first and second frictional surfaces to cause the driving member to rotate the driven member. The control means can pulse width modulate the supplied power for "soft" starting and/or stopping of the compressor.

DESCRIPTION OF THE PREFERRED EMBODIMENTS

Figure 1:
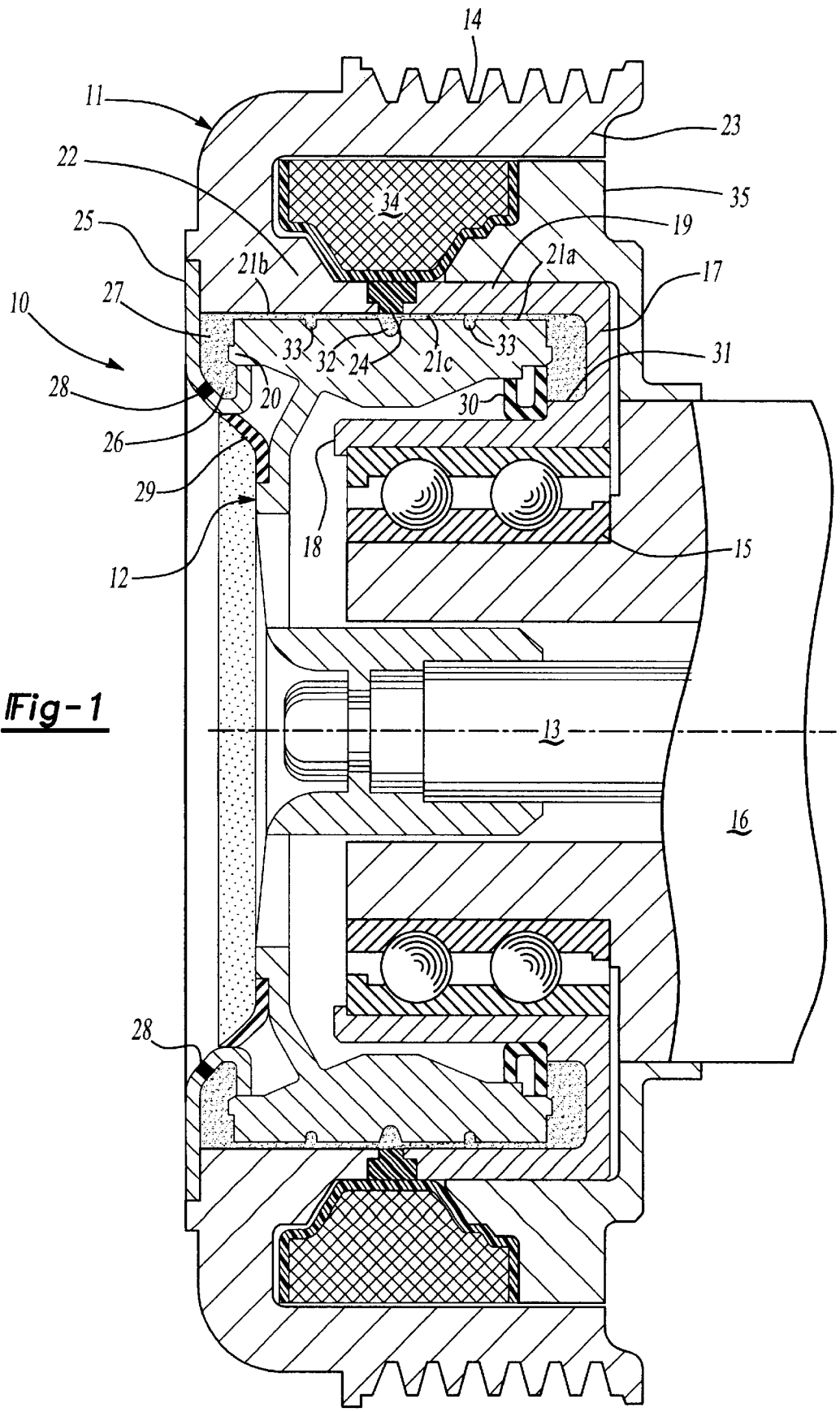
FIG. 1 is a cross sectional view of a clutch according the present invention.

Referring first to FIG. 1, there is shown a clutch 10 for driving an air conditioning compressor (not shown) from an engine (not shown) in a motor vehicle (not shown). The clutch 10 includes a driving member 11 in the form of a pulley and a driven member 12 coupled to a shaft 13 of the compressor. The pulley 11 is driven by the vehicle engine through a belt (not shown) that engages V-grooves 14 formed in an exterior surface of the pulley in a known manner to provide rotation thereof while the vehicle engine is running. The clutch 10 allows the compressor to be selectively engaged with and disengaged from the pulley 11.

An annular bearing 15 is mounted on an axial extension of a housing 16 of the compressor. A ring shaped bearing mount 17 has an axially extending U-shaped cross section with an inner leg 18 supported on the bearing 15 and a generally parallel outer leg 19. The driven member 12 includes a peripheral flange 20 that extends axially between the legs 18 and 19 and has an axially extending circumferential annular first friction surface 21a facing the outer leg 19. The pulley 11 also is ring shaped and has an axially extending U-shaped cross section with an inner leg 22 and a generally parallel outer leg 23. The V-grooves 14 are formed on an outwardly facing surface of the outer leg 23 and the inner leg 22 extends toward the outer leg 19 of the bearing mount 17 in a common plane. The legs 19 and 22 form an annular second friction surface 21b facing the first friction surface 21a. The facing friction surfaces 21a and 21b form an annular space 21c therebetween. The facing ends of the legs 19 and 22 are spaced apart to form a gap in which a nonferrous spacer 24 is positioned. The spacer 24 couples the pulley 11 to the bearing mount 17 for co-rotation on the bearing 15.

A front cover 25 has a generally J-shaped cross section and is attached to the pulley 11 at a bottom of the inner leg 22. The cover 25 extends from the pulley 11 into contact with an outer end of the flange 20 to form an enclosed first reservoir 26 for a quantity of magnetic powder 27 disposed therein. The reservoir 26 can be filled with the magnetic powder 27 through an aperture in the cover 25 sealed with a removable plug 28. A seal 29 is attached to the driven member 12 and contacts the front cover 25 to protect the sliding seal where the cover contacts the flange 20. A generally U-shaped seal 30 is attached to the inner leg 18 of the bearing mount 17 and contacts an inner end of the flange 20 to form an enclosed second reservoir 31 for a quantity of the magnetic powder 27 disposed therein. The reservoirs 26 and 31 are in communication through the space 21c between the friction surfaces 21a and 21b. The surface 21a has an annular central groove 32 formed therein opposite the spacer 24 and a pair of narrower secondary grooves 33 formed therein on either side of the central groove 32.

A wire wound coil 34 is positioned between the legs 22 and 23 of the pulley 11. The coil 34 is attached to a coil mounting bracket 35 mounted on the air compressor housing 16. Thus, the coil 34 and the mounting bracket 35 remain stationary as the pulley 11 is rotated by the vehicle engine. When no current is flowing in the coil 34, the driven member 12 and the shaft 13 are not rotating. As described below, when electrical power is applied to the coil 34, a magnetic field is created with lines of force being concentrated in the air gap 21c between the surfaces 21a and 21b. The magnetic field polarizes the magnetic particles 27 such that they are attracted to one another to the point that the pulley 11 becomes coupled to the driven member 12 thereby rotating the shaft 13 and operating the compressor.

Such magnetic powders 27 are well known to one skilled in the art and are not described in great detail here. However, such powders have good magnetic properties and are resistant to corrosion and wear. A preferred embodiment utilizes 400-level stainless powders, which contain iron, chromium, and other elements at low concentration. The powder is readily flowable so as to fill the space 21c between driving and driven members and should not form an irreversible compaction. The particle size and shape are chosen to obtain these desired characteristics. Particle sizes are preferably between 1 to 100 micrometers and are spherical or spheroidal. Alternatively, irregular shapes may be desired. A dispersing agent, typically small quantities of silica, graphite, zinc oxide, or other particulate materials, are preferably added to improve the flow properties of the powder. Alternatively, one skilled in the art could provide a magnetorheological fluid (MR fluid) in the space therebetween, in which case, one must include the appropriate seals to retain the MR fluid.

The magnetic powder material 27 provides a coupling between the friction surfaces 21a and 21b when a magnetic field is applied thereto. The shear yield stress ($\tau_y$) of the material is related to the intensity of the magnetic field. Thus, when a low intensity magnetic field is applied, the clutch 10 may be permitted to slip. The torque transfer characteristics of the clutch can be widely controlled as described below. The clutch 10 is capable of operating under slipping conditions, as is further described below.

Figure 2:
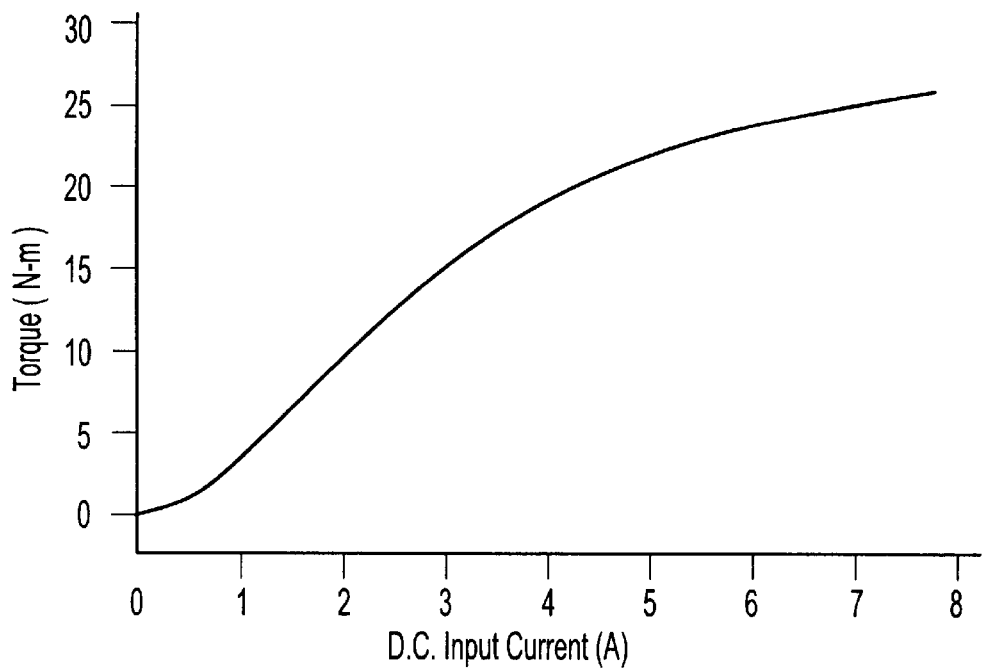
FIG. 2 is a graph illustrating the torque to current relationship in the clutch of the FIG. 1.

The magnetic field generated by the coil 34 magnetizes the powder 27 particles, causing them to attract each other, forming chains or complex structures, along the magnetic field lines that span the space 21c and link the driving and driven members mechanically in a manner known to one skilled in the art. The strength of this attractive force, and consequently the torque transfer capacity of the clutch, is a continuous (but nonlinear) function of the applied field, as shown graphically in FIG. 2 as a curve 36 of torque versus current. The torque is related to the magnetic field strength, and therefore to the applied D.C. input current. Output torque is controlled by varying the D.C. input current as described below.

The nonferrous spacer 24 creates a nonferrous portion of the pulley 11 at approximately the center of the coil 34. The nonferrous spacer 24 is provided to force most of the magnetic flux to flow through the powder 27 to the driven member 12 by minimizing leakage around the spacer. The spacer 24 should be strong and possess good dimensional stability and thus is preferably constructed from aluminum, brass, or nonmagnetic stainless steels. Alternatively, the spacer 24 could be omitted or replaced by ferrous metal in an application where it is determined that the device efficiency is not critical.

A variety of metals could be used in the ferrous portions of the clutch 10, including the pulley 11, the driven member 12 and the bearing mount 17. These members are preferably made from low-carbon steel such as 1008 or 1010, cast irons, 400-level stainless steels, powder-metal processed materials or any other suitable material known to one skilled in the art.

The coil 34 is preferably a multistrand copper wire coil wound around a nonferrous bobbin, or can be wound and potted as a freestanding entity (not shown). The portion of the mounting bracket 35 that is inserted into the pulley 11 is constructed of a ferrous material to enable magnetic flux to flow. In an alternative embodiment, the coil 34 can be aluminum wire.

In the preferred embodiment, the coil 34 is fixed to avoid the problems of embedding a coil in a rotating member. A rotating coil requires the use of slip rings to make the electrical connection, which are less reliable than the fixed coil illustrated in the FIG. 1.

Because the facing friction surfaces 21a and 21b are cylindrical, during rotation the magnetic powder 27 is forced outwardly against the surface 21b, thereby reducing drag of the powder 27 when the magnetic field is removed. When a magnetic field is applied, the level of torque transfer (T) of the clutch for this cylindrical arrangement is expressed approximately as:

$$T=2\pi LR^2\tau_Y$$

wherein "L" is the effective axial length of the friction surface 21a of the driven member 12, "R" is the radius of surface 21a from the longitudinal axis of the shaft 13, and "$\tau_Y$" is the shear yield stress of the powder 27.

Figure 3:
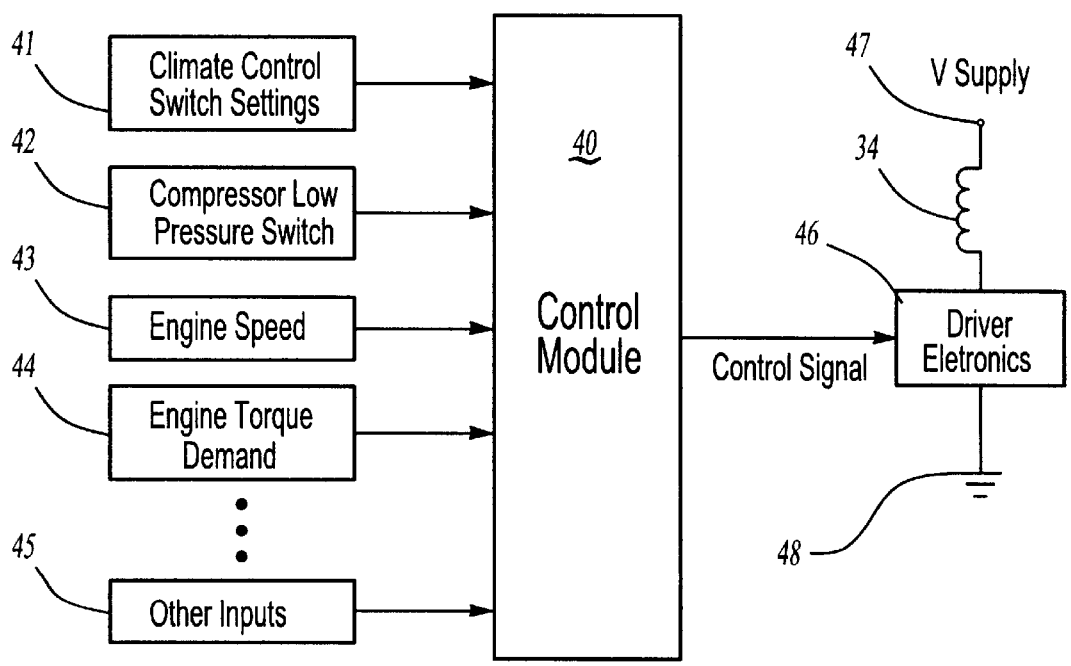
FIGS. 3 through 5 are schematic representations of electronic circuits to operate a clutch as shown in the FIG. 1.

There is shown in the FIG. 3 a schematic circuit diagram of a control circuit for the clutch 10. A control module 40 has a plurality of inputs connected to signal sources such as a "Climate Control Switch Settings" source 41, a "Compressor Low Pressure Switch" source 42, an "Engine Speed" source 43, an "Engine Torque Demand" source 44, and "Other Inputs" sources 45 to receive information relevant to the operation of the clutch 10. The control module 40 utilizes these input signals to determine when to engage the clutch 10. An output of the control module 40 is connected to an input of a driver electronics circuit 46. The circuit 46 is connected in series with the coil 34 between a power supply terminal 47 and a circuit ground potential terminal 48. The control module 40 generates a control signal to the driver electronics circuit 46 to control the flow of current through the coil 34.

Figure 4:
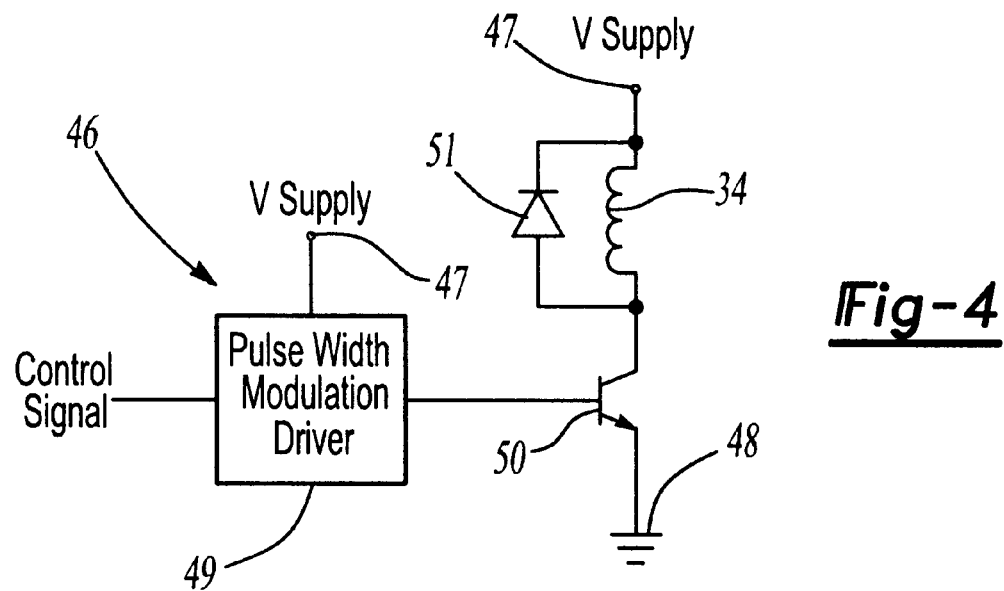

The driver electronics circuit 46 is shown in more detail in the FIG. 4. A pulse-width modulation driver 49 has an input for receiving the control signal from the control module 40, another input connected to the power supply terminal 47 and an output connected to a base of a bipolar (or FET) power transistor 50. The transistor 50 has a collector connected to the coil 34 and an emitter connected to the ground terminal 48. A diode 51 is connected in parallel with the coil 34 with an anode connected to the transistor collector and a cathode connected to the power supply terminal 47. The driver 49 generates a high fixed frequency signal of variable pulse width to turn on and off the transistor 50. The driver 49 can be programmed to gradually increase and decrease the current for engagement and disengagement of the clutch 10. The driver 49 also can respond to the control signal to reduce the current flowing in the coil to conserve electrical power during low clutch torque demand conditions.

Figure 5:
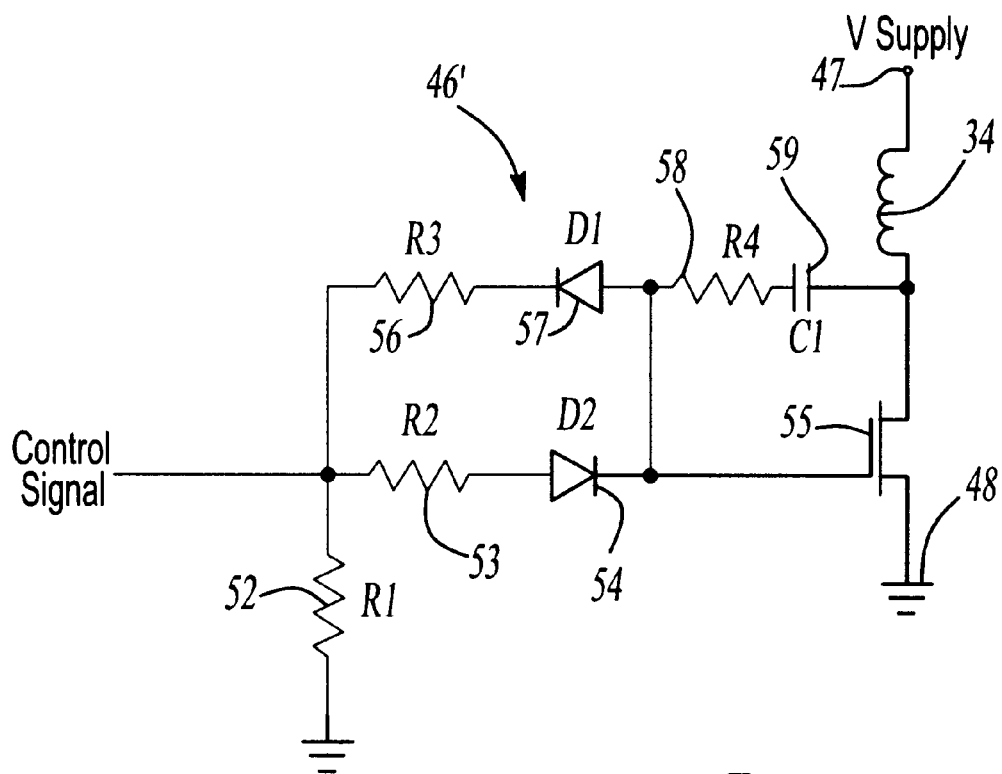

An alternate embodiment driver electronics circuit 46' is shown in the FIG. 5. The control signal line from the control module 40 is connected through a first resistor 52 to the ground terminal 48. The line is connected through a second resistor 53 to an anode of a first diode 54. The first diode 54 has a cathode connected to a gate of a FET power transistor 55. The line is further connected through a third resistor 56 to a cathode of a second diode 57. The second diode 57 has an anode connected to the cathode of the first diode 54. The anode of the second diode 57 also is connected through a fourth resistor 58 to one side of a capacitor 59. Another side of the capacitor 59 is connected through the coil 34 to the power supply terminal 47. The transistor 55 is connected between the ground terminal 48 and the junction of the coil 34 and the capacitor 59. The circuit 46' is responsive to the control signal to generate a ramp signal increase and decrease in coil voltage for clutch engagement and disengagement. The turn-on characteristic time is controlled by the product of the value of the second resistor 53 and the value of the capacitor 59, while the turn-off characteristic time is controlled by the product of the value of the third resistor 56 and the value of the capacitor 59.

The control circuits shown in the FIGS. 3–5 control the torque transfer capacity of the magnetic powder clutch 10. These control means enable the clutch 10 to be softly engaged and disengaged to minimize or eliminate the generation of stumble and noise. The torque capacity of the clutch 10 is a function of the instantaneous value of the current in the coil 34. The rise and fall times for the torque are comparable to the inductive time constant of the clutch coil 34. The inductive time constant is in general so short that if the coil 34 is excited by the stepwise application of battery voltage, the engagement and disengagement events are quite perceptible. The soft-start character of the clutch 10 is therefore preferably obtained by engaging and disengaging the clutch using a time-dependent voltage with a characteristic duration of approximately 2.5 seconds. One skilled in the art recognizes that longer duration may be desirable in various applications. Substantially shorter rise and fall times result in perceptible stumble, while times that are substantially longer may cause increased mechanical power loss due to prolonged clutch slip.

One skilled in the art appreciates that various means are available to control clutch torque capacity, and the preferred embodiments described herein are merely illustrative. A number of alternatives each involving different levels of complexity and expense are possible for soft-start operation. The above-described preferred embodiments retain the same basic mode of operation as the conventional clutch/compressor system, including an increase in the system pressure caused by vaporization of the refrigerant upon increased cooling demand, which causes a pressure switch to close, whereafter the a/c mode signal rapidly approaches the battery voltage.

The form of the invention shown and described herein constitutes preferred embodiments of the invention; it is not intended to illustrate all possible forms thereof. The words used are words of description rather than of limitation, and various changes may be made from that which is described here without departing from the spirit and scope of the invention.

What is claimed is:
1. An electromagnetic clutch for an air conditioning compressor housed in a compressor housing having a drive shaft extending from the housing and being rotatable about an axis of rotation, the clutch comprising:
  a generally cylindrical driven member having an axis of rotation and a peripheral annular first frictional surface;
  an annular driving member extending about said driven member and having an axis of rotation coaxial with said driven member axis of rotation, said driving member having an annular second frictional surface positioned radially adjacent said first frictional surface to form an annular space therebetween;
  a plurality of reservoirs, each of said plurality of reservoirs in fluid communication with said annular space;
  a quantity of flowable magnetic material provided in said annular space and said plurality of reservoirs;
  a magnetic coil positioned adjacent said annular space; and
  a control means connected to said magnetic coil for supplying electrical power from a power supply to energize said magnetic coil whereby when said driven member is attached to a shaft of a compressor extending from a compressor housing, said driving member is rotatably mounted on the compressor housing and said magnetic coil is fixed to the compressor housing, said driving member can be rotated without rotating said driven member, and when said control means applies electrical power to said magnetic coil, magnetic flux is created in said annular space polarizing said magnetic material and frictionally coupling said first and second frictional surfaces to cause said driven member to rotate with said driving member.

2. A clutch according to claim 1 wherein said magnetic material comprises a magnetorheological fluid.

3. A clutch according to claim 1 wherein said magnetic material comprises a magnetic powder.

4. A clutch according to claim 3 wherein said magnetic powder comprises a 400-level stainless powder having a particle size between 1 to 100 micrometers with a spherical or spheroidal shape.

5. A clutch according to claim 4 wherein said magnetic powder further includes a dispersing agent.

6. A clutch according to claim 1 wherein said control means includes a switch to vary a voltage applied to said magnetic coil for soft starting.

7. A clutch according to claim 6 wherein said control means switches said switch with a pulse width modulated control signal.

8. A clutch according to claim 6 wherein said control means switches said switch with a ramped control signal.

9. A clutch according to claim 1 wherein said control means is responsive to an input signal representing a characteristic associated with the compressor for controlling said switch.

10. An electromagnetic clutch for an air conditioning compressor housed in a compressor housing having a drive shaft extending from the housing and being rotatable about an axis of rotation, the clutch comprising:

a generally cylindrical driven member having an axis of rotation and a peripheral annular first frictional surface, said driven member having a first axial end and a second axial end;

an annular pulley extending about said driven member and having an axis of rotation coaxial with said driven member axis of rotation, said pulley having an annular second frictional surface positioned radially adjacent said first frictional surface to form an annular space therebetween;

a plurality of reservoirs, each of said plurality of reservoirs in fluid communication with said annular space, at least one of said plurality of reservoirs disposed adjacent the first axial end of said driven member and another of said plurality of reservoirs disposed adjacent the second axial end of said driven member;

a quantity of flowable magnetic material provided in said annular space and said plurality of reservoirs;

a magnetic coil positioned adjacent said annular space; and a control means connected to said magnetic coil for supplying electrical power from a power supply to energize said magnetic coil whereby when said driven member is attached to a shaft of a compressor extending from a compressor housing, said pulley is rotatably mounted on the compressor housing and said magnetic coil is fixed to the compressor housing, said pulley can be rotated without rotating said driven member, and when said control means applies electrical power to said magnetic coil, magnetic flux is created in said annular space polarizing said magnetic material and frictionally coupling said first and second frictional surfaces to cause said driven member to rotate with said pulley.

11. A clutch according to claim 10 wherein said control means includes a switch to vary a current applied to said magnetic coil.

12. A clutch according to claim 11 wherein said control means switches said switch with a pulse width modulated control signal.

13. A clutch according to claim 11 wherein said control means switches said switch with a ramped control signal.

14. An air conditioning compressor assembly of the type for compressing a refrigerant fluid, said assembly comprising:

a fluid pump in a housing having a drive shaft rotatably supported about a central axis and operatively connected to said fluid pump, a portion of said drive shaft extending from said housing;

a generally circular driven member fixedly secured to said drive shaft adjacent said housing, said driven member having a peripheral annular first clutch surface including at least one annular groove formed therein;

a pulley rotatably supported on said housing independently of said drive shaft for rotation about said central axis and including an annular second clutch surface adjacent said first clutch surface forming an annular space therebetween;

a plurality of reservoirs, each of said plurality of reservoirs in fluid communication with said annular space;

a quantity of a magnetic material provided in said annular space and said plurality of reservoirs;

a magnetic coil fixedly mounted on said housing adjacent said annular space; and a control means operable to apply electrical power to said magnetic coil to create magnetic flux across said annular space to energize said magnetic material and cause said driven member to rotate with said pulley.

15. An assembly according to claim 10 wherein said control means gradually changes a voltage level applied to said magnetic coil over a predetermined time.

16. An assembly according to claim 11 wherein said control means gradually changes the voltage level by pulse width modulation.

17. An assembly according to claim 11 wherein said control means gradually changes the voltage level by ramping.

18. An assembly according to claim 10 wherein said control means is responsive to an input signal representing a characteristic associated with the compressor for changing the voltage level.

19. An assembly according to claim 14 wherein said characteristic is one of climate control switch settings, compressor low pressure switch, engine speed and engine torque demand.

20. An assembly according to claim 10 wherein said pulley has an annular space formed therein and said magnetic coil is positioned in said annular space.

* * * * *

UNITED STATES PATENT AND TRADEMARK OFFICE
CERTIFICATE OF CORRECTION

PATENT NO. : 6,290,043 B1
DATED : September 18, 2001
INVENTOR(S) : John M. Ginder et al.

It is certified that error appears in the above-identified patent and that said Letters Patent is hereby corrected as shown below:

<u>Title page,</u>
Item [75], change the last name of the fifth listed inventor from "Cohen" to -- Colvin --.

Signed and Sealed this

Twenty-sixth Day of March, 2002

JAMES E. ROGAN
*Director of the United States Patent and Trademark Office*

*Attest:*

*Attesting Officer*